(12) United States Patent
Kim

(10) Patent No.: US 9,709,123 B2
(45) Date of Patent: Jul. 18, 2017

(54) ACTIVE MOUNT

(71) Applicant: Hyundai Motor Company, Seoul (KR)

(72) Inventor: Seung-Won Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/863,116

(22) Filed: Sep. 23, 2015

(65) Prior Publication Data

US 2016/0327116 A1 Nov. 10, 2016

(30) Foreign Application Priority Data

May 6, 2015 (KR) ........................ 10-2015-0063136

(51) Int. Cl.
*F16F 13/26* (2006.01)
*F16F 13/10* (2006.01)

(52) U.S. Cl.
CPC .......... *F16F 13/266* (2013.01); *F16F 13/102* (2013.01)

(58) Field of Classification Search
CPC .............................. F16F 13/266; F16F 13/102
USPC .......... 267/140.14, 140.15, 140.13; 335/255, 335/261, 262, 279
See application file for complete search history.

(56) References Cited

U.S. PATENT DOCUMENTS

| 7,413,174 B2* | 8/2008 | Okumura | F16F 13/264 267/140.13 |
| 7,537,202 B2* | 5/2009 | Watanabe | F16F 13/101 267/140.14 |
| 2004/0086134 A1* | 5/2004 | Matsuoka | F16F 13/26 381/71.4 |
| 2005/0200061 A1* | 9/2005 | Nemoto | B60L 11/14 267/140.14 |
| 2007/0182077 A1 | 8/2007 | Kon | |
| 2009/0045560 A1* | 2/2009 | Fueki | F16F 13/26 267/140.15 |
| 2009/0256294 A1* | 10/2009 | Lee | F16F 13/26 267/140.14 |
| 2012/0013057 A1* | 1/2012 | Nemoto | F16F 13/268 267/140.14 |

(Continued)

FOREIGN PATENT DOCUMENTS

| JP | 3-229033 A | 10/1991 |
| JP | 2000-283214 A | 10/2000 |

(Continued)

*Primary Examiner* — Thomas J Williams
*Assistant Examiner* — Mariano Sy
(74) *Attorney, Agent, or Firm* — Morgan Lewis & Bockius LLP

(57) ABSTRACT

An active mount in which a nozzle plate is mounted between an insulator and a diaphragm to divide an inner space into an upper liquid chamber and a lower liquid chamber, and an encapsulated hydraulic liquid flows from the nozzle plate through a first flow path depending on a change in fastened state of the liquid chambers may include the nozzle plate having a second flow path and allowing the upper liquid chamber and the lower liquid chamber to be in communication with each other, the diaphragm made of a material having elasticity and coupled to a lower portion of the nozzle plate to form the lower liquid chamber, the diaphragm having an inflection portion, and a yoke including a body portion having an upper end in close contact with a lower portion of the inflection portion, and a rod portion coupled to a lower portion of the body portion.

7 Claims, 7 Drawing Sheets

(56) References Cited

U.S. PATENT DOCUMENTS

| | | | |
|---|---|---|---|
| 2012/0200021 A1* | 8/2012 | Kanaya | F16F 13/268 267/140.14 |
| 2012/0242020 A1* | 9/2012 | Muraoka | F16F 13/26 267/140.14 |
| 2014/0159292 A1* | 6/2014 | Kim | F16F 13/26 267/140.14 |
| 2016/0001648 A1* | 1/2016 | Kim | B60K 5/1283 248/566 |
| 2016/0123426 A1* | 5/2016 | Kim | F16F 13/002 267/140.14 |

FOREIGN PATENT DOCUMENTS

| | | |
|---|---|---|
| JP | 2002-206590 A | 7/2002 |
| JP | 2006-138395 A | 6/2006 |
| JP | 2006-275184 A | 10/2006 |
| JP | 5028390 B2 | 6/2012 |
| KR | 10-1462911 B1 | 11/2014 |

\* cited by examiner

Electric current is applied (when vehicle travels)

Electric current is cut off (when vehicle is idling)

ACTIVE MOUNT

CROSS-REFERENCE TO RELATED APPLICATIONS

The present application claims priority to Korean Patent Application No. 10-2015-0063136, filed May 6, 2015, the entire contents of which is incorporated herein for all purposes by this reference.

BACKGROUND OF THE INVENTION

Field of the Invention

The present invention relates to an active mount which is mounted to a vehicle body to support an engine and changes damping characteristics depending on properties of transmitted vibration, and more particularly, to an active mount having a structure in which metallic scraps are mounted to a part portion, which constitutes a second lower liquid chamber, to suppress elastic deformation of the part portion using magnetic force in order to more precisely restrict behavior of the second lower liquid chamber.

Description of Related Art

An engine of a vehicle is installed in an engine room of a vehicle body by means of an (engine) mount in order to attenuate vibration in the engine. As the mount that is applied to a passenger vehicle, a rubber mount which insulates and attenuates vibration using elastic force of rubber, and a fluid filled type mount (hydraulic mount) in which a predetermined amount of a hydraulic liquid is encapsulated are generally and widely used.

Among the mounts, the fluid filled type mount has a structure in which a predetermined amount of hydraulic liquid is encapsulated therein and vibration is attenuated by a flow of the hydraulic liquid, and has an effect of simultaneously attenuating vibration in a high frequency region and a low frequency region, such that a range of application of the fluid filled type mount is gradually increased. Further, in order to more efficiently attenuate vibration in a certain frequency region by improving the fluid filled type mount, development of an active mount, which may actively control damping characteristics, is being conducted.

The active mount is configured to control dynamic characteristics of the mount in an On/Off manner. Further, in the case of the active mount, a volume-stiffness method, which controls behavior of a membrane that vibrates depending on a flow of the hydraulic liquid, and a by-pass method, which additionally forms a second flow path, which allows an upper liquid chamber and a lower liquid chamber to be in communication with each other, and restricts the communication of the second flow path, are widely used.

In general, in the case of a diesel engine vehicle, the by-pass method, which exhibits low properties (a dynamic ratio of about 0.6) in a low frequency region (20 to 40 Hz), is mainly used.

As illustrated in FIG. 1A and FIG. 1B, in an active mount according to the by-pass method in the related art, an insulator 140 made of elastic material is mounted at an upper side in a case, a diaphragm 101 is coupled at a low end of the case, and a nozzle plate 130 is mounted between the insulator 140 and the diaphragm 101, such that an internal space is divided into an upper liquid chamber and a lower liquid chamber. The nozzle plate 130 is configured so that an annular flow path 131 is formed in the nozzle plate 130 along a circumference of the nozzle plate 130 such that the encapsulated hydraulic liquid may flow between the upper liquid chamber 133 and the lower liquid chamber. The flow of the hydraulic liquid occurs as a volume in the upper liquid chamber is increased and decreased when the insulator 140 is elastically deformed by load movement and vibration transmitted from the engine.

A second flow path 132, which allows the upper liquid chamber 133 and the lower liquid chamber 103 to be additionally in communication with each other, is provided in the nozzle plate 130, and a body portion 104 having a cup shape presses an inflection portion of the diaphragm from a lower side of the inflection portion to divide the lower liquid chamber into a first lower liquid chamber 102 and a second lower liquid chamber 103. The first lower liquid chamber 102 is in communication with the upper liquid chamber 133 through the flow path 131, and the second lower liquid chamber 103 is in communication with the upper liquid chamber 133 through the second flow path 132.

A hole 105 is formed in a bottom surface of the body portion 104, and the hole 105 is opened and closed by a rod portion 108 which is moved upward and downward below the hole 105. When electric power is applied to the coil 106, the rod portion 108 is moved upward by electromagnetic force and closes the hole 105. When the hole 105 is closed, air is blocked from flowing to the interior of the body portion 104 (that is, a space between the body portion 104 and a part portion 101a), such that the part portion 101a, which is a portion of the diaphragm 101 positioned inside the body portion 104, is prevented from being elastically deformed, and as a result, a flow of the hydraulic liquid flowing through the second flow path 132 is restricted.

However, because the interior of the body portion 104 is not in a complete vacuum state (that is, because elastic behavior of the part portion is possible) even though the hole 105 is closed, there is a problem in that the hydraulic liquid minutely flows even through the second flow path 132.

That is, the structure of the related art has problems in that as the hydraulic liquid flows through the second flow path 132, a loss factor is decreased, and dynamic characteristics deteriorate.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an active mount capable of preventing a decrease in a loss factor and a deterioration in dynamic characteristics by completely blocking vibration at a part portion when electric power is applied to a coil.

According to various aspects of the present invention, an active mount in which a nozzle plate is mounted between an insulator and a diaphragm to divide an inner space into an upper liquid chamber and a lower liquid chamber, and an encapsulated hydraulic liquid flows from the nozzle plate through a first flow path depending on a change in fastened state of the liquid chambers, may include the nozzle plate having a second flow path that is spaced apart from the first flow path and allowing the upper liquid chamber and the lower liquid chamber to be in communication with each other, the diaphragm made of a material having elasticity and coupled to a lower portion of the nozzle plate to form the lower liquid chamber, the diaphragm having an inflection portion that is disposed to be in direct contact with a lower surface of the nozzle plate, and a yoke including a body portion that has a cup shape and has an upper end in close contact with a lower portion of the inflection portion, and a rod portion that is coupled to a lower portion of the body portion, the yoke configured to be magnetized when electric power is applied to a coil that is disposed adjacent to the yoke, in which the lower liquid chamber may be divided into a first lower liquid chamber which is disposed outside the inflection portion and in communication with the first flow path, and a second lower liquid chamber which is disposed inside the inflection portion and in communication with the second flow path, and metallic scraps may be coupled to a part portion of the diaphragm which is defined as an inside portion of the inflection portion so as to form the second lower liquid chamber, such that when the yoke is magnetized, elastic behavior of the part portion is restricted.

The scraps may be mounted to and included in the part portion, and when the yoke is magnetized, the part portion may be configured to elastically expand so as to come into close contact with an inner circumferential surface of the body portion, such that the elastic behavior is restricted.

A protruding surface, which is convexly bent upward, may be formed on a bottom surface of the part portion A venting hole may be formed in the body portion so that air between the part portion and the body portion is discharged when the part portion elastically expands.

The scraps may be disposed to form multiple rows on the bottom surface and the outer circumferential surface of the part portion.

The present invention having the aforementioned configuration more assuredly restricts elastic behavior of the part portion, thereby controlling a flow of the hydraulic liquid flowing through the second flow path.

Since the active mount may be applied by remodeling only the yoke and the diaphragm in the structure in the related art, it is possible to reduce production costs, the structure is comparatively simple and has better durability, and it is possible to obtain a higher rate of change in properties when electric power is turned on and off It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
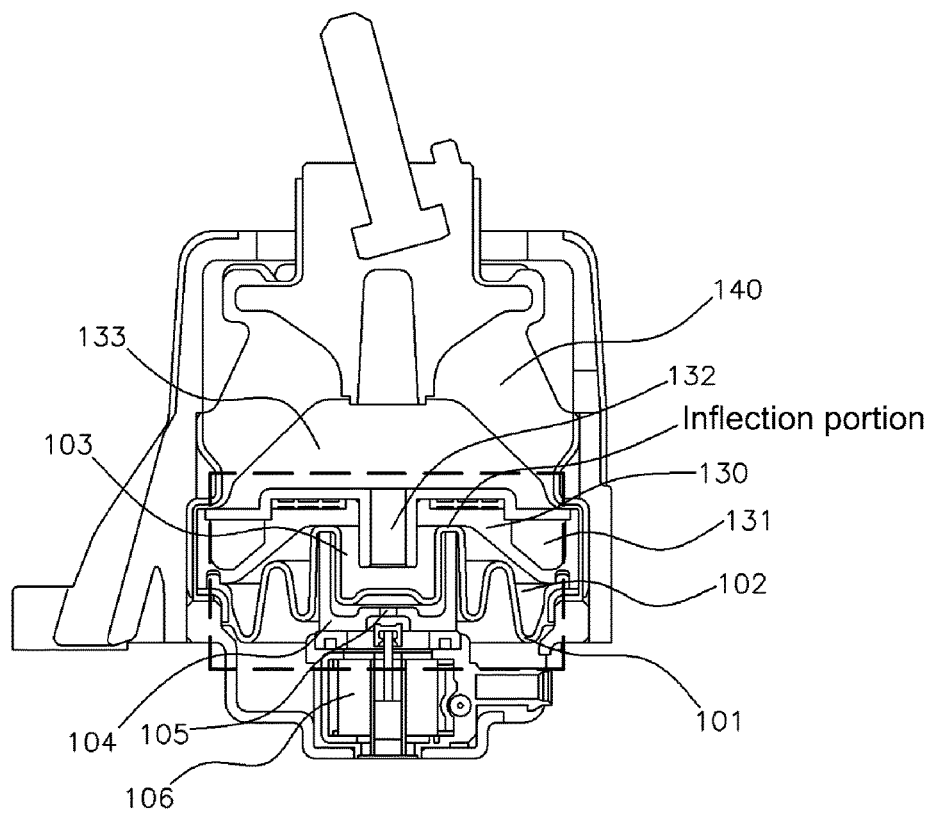
FIG. 1A and FIG. 1B are views illustrating an appearance in which an active mount in the related art is cut out in a longitudinal direction and an appearance in which the active mount is partially enlarged.
Figure 1B:
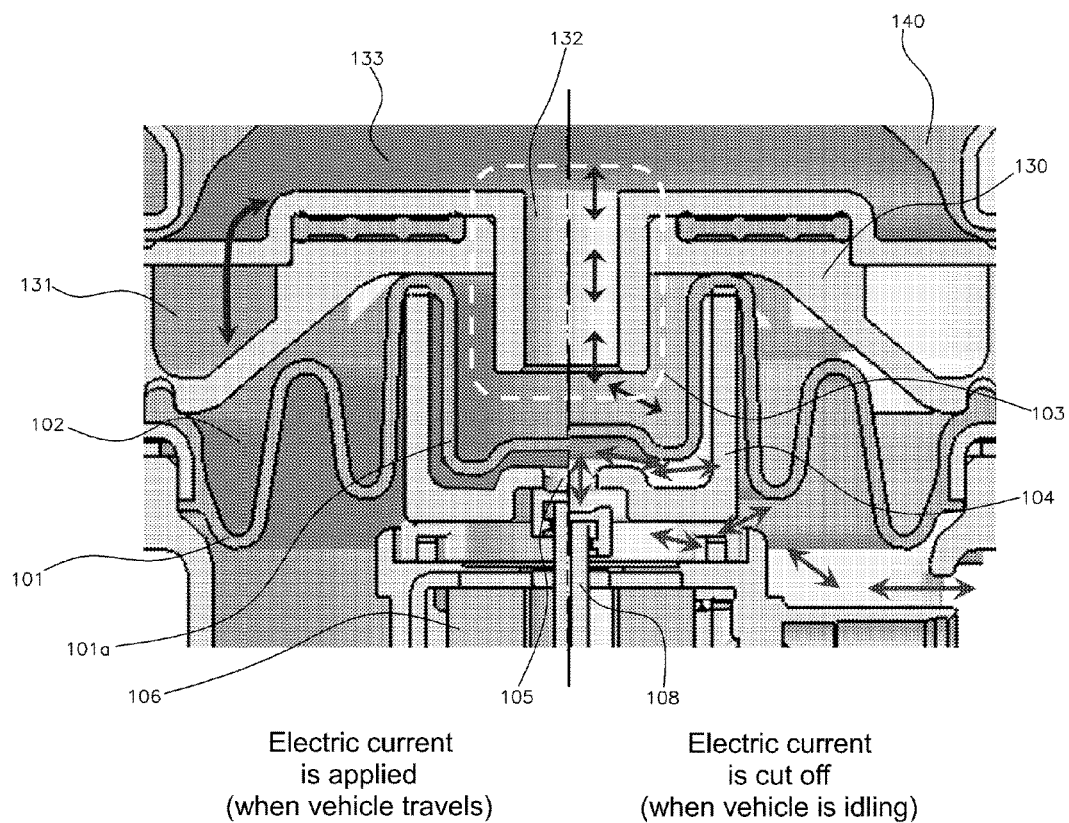
Figure 2A:
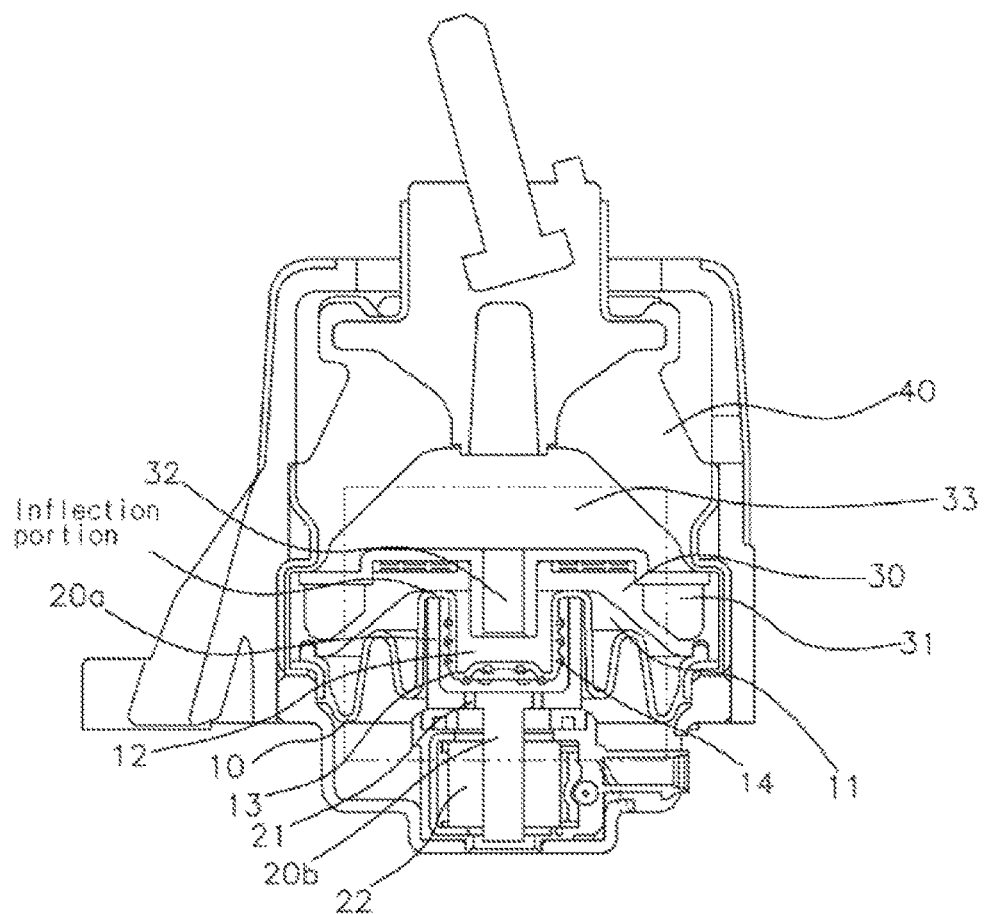
FIG. 2A is a view illustrating an appearance in which an exemplary active mount according to the present invention is cut out in a longitudinal direction.
Figure 2B:
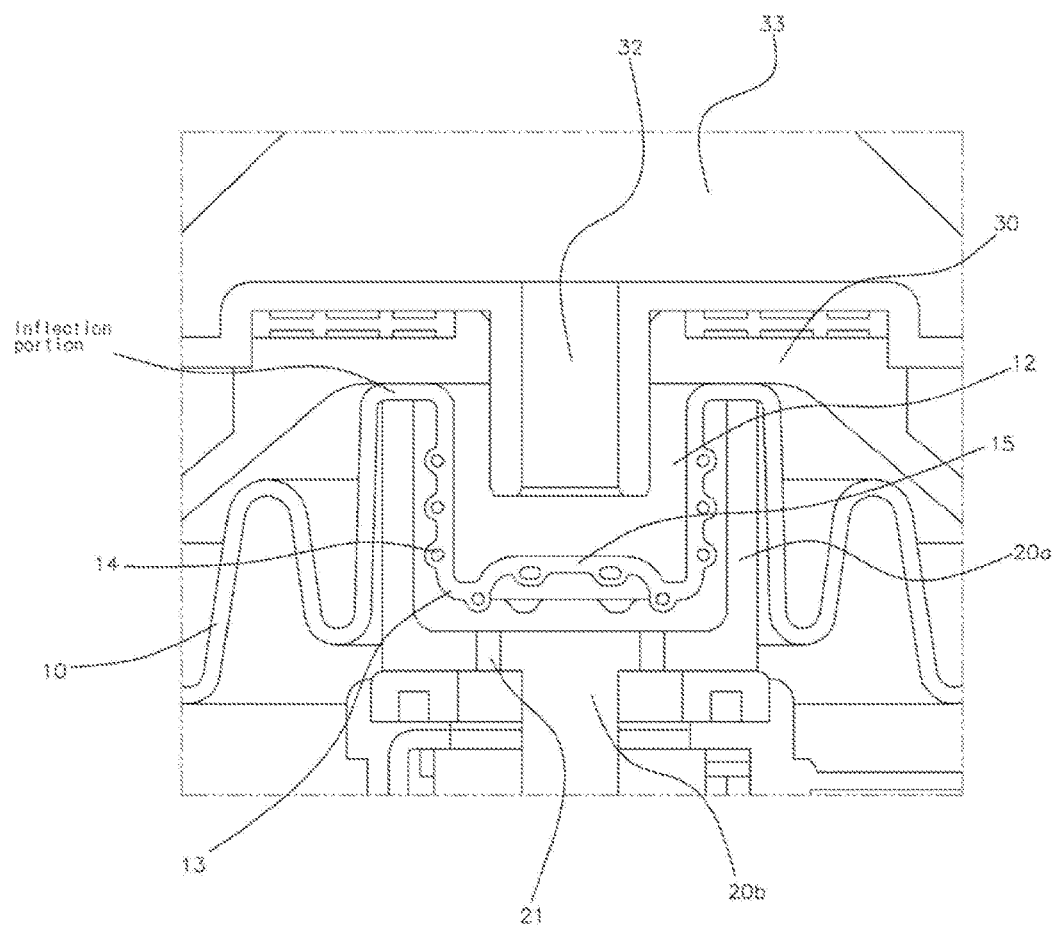
FIG. 2B is a view illustrating an appearance in which the exemplary active mount is partially enlarged.
Figure 3:
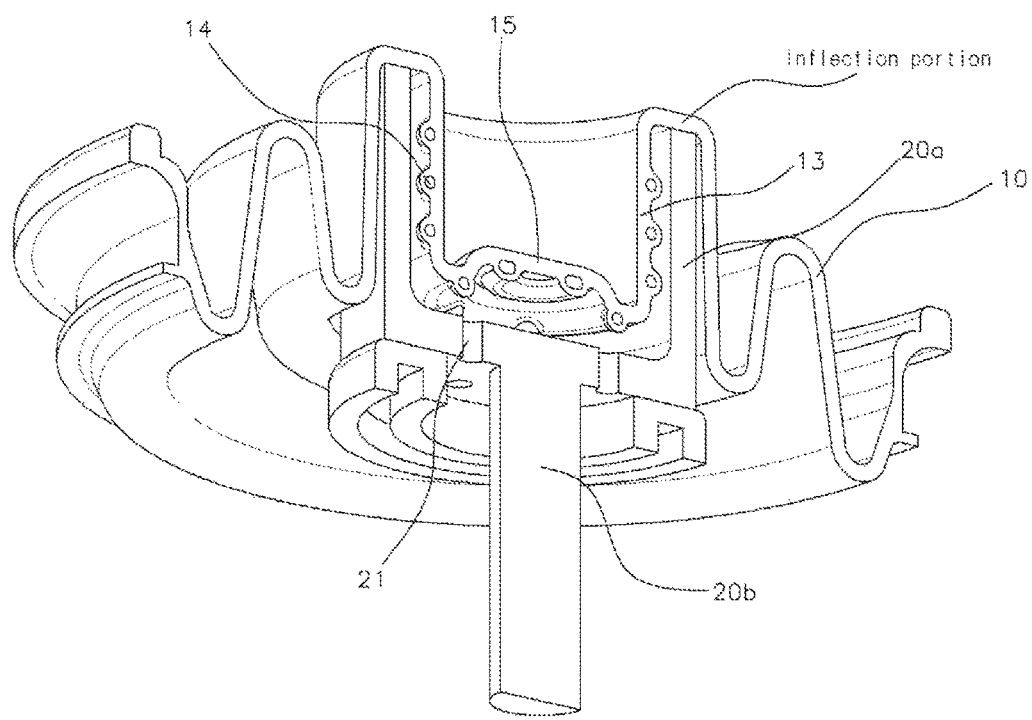
FIG. 3 is a view illustrating an appearance in which the exemplary active mount according to the present invention is cut out in the longitudinal direction in a state in which a diaphragm and a yoke are coupled.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention relates to an active mount in which a nozzle plate 30 is mounted between an insulator 40 and a diaphragm 10 to divide an inner space into an upper liquid chamber 33 and a lower liquid chamber, and an encapsulated hydraulic liquid flows from the nozzle plate 30 through a flow path 31 and a second flow path 32 depending on a change in fastened state of the liquid chambers. Hereinafter, various embodiments of the present invention will be described in more detail with reference to the drawings.

Referring to FIG. 2A to FIG. 4, like the structure in the related art, in the active mount according to the present invention, the second flow path 32, which is spaced apart from the annular flow path 31 and allows the upper liquid chamber 33 and the lower liquid chamber to be in communication with each other, is formed at a center of the nozzle plate 30, the diaphragm 10 is made of a material having elasticity and coupled to a lower portion of the nozzle plate 30 to form the lower liquid chamber that is divided into a first lower liquid chamber 11 and a second lower liquid chamber 12, and the diaphragm 10 is configured to have an inflection portion (a portion that defines a boundary between the first lower liquid chamber and the second lower liquid chamber) that is disposed to be in direct contact with a lower surface of the nozzle plate 30.

In contrast, the present invention further includes a yoke in which a body portion 20a and a rod portion 20b are integrally configured. The body portion 20a has a cup shape, and has an upper end that is mounted so as to be in close contact with a lower portion of the inflection portion. The rod portion 20*b* is coupled to a lower portion of the body portion 20*a* or formed integrally with the lower portion of the body portion 20*a*, and magnetized together with the body portion 20*a* when electric power is applied to a coil 22 that is disposed to be adjacent to a lower end of the rod portion 20*b*.

The lower liquid chamber is divided into the first lower liquid chamber 11 which is disposed outside the inflection portion and in communication with the flow path 31, and the second lower liquid chamber 12 which is disposed inside the inflection portion and in communication with the second flow path 32. Further, metallic scraps 14 are coupled to a part portion 13 of the diaphragm 10 which is defined as an inside portion of the inflection portion so as to form the second lower liquid chamber 12.

The scraps 14 are mounted to be included in the part portion 13 and protrude from an outer circumferential surface of the part portion 13 (see a part indicated by 'S' in FIG. 4 in which the scraps are included), and when the yoke is magnetized, the part portion 13 elastically expands so as to be in close contact with an inner circumferential surface of the body portion 20*a*, thereby restricting elastic behavior.

Venting holes 21 are formed in the body portion 20*a* so that air between the part portion 13 and the body portion 20*a* is discharged when the part portion 13 elastically expands. Further, in order to allow air to be easily discharged, a protruding surface 15, which is convexly bent upward, is additionally formed on a bottom surface of the part portion 13.

Figure 4:
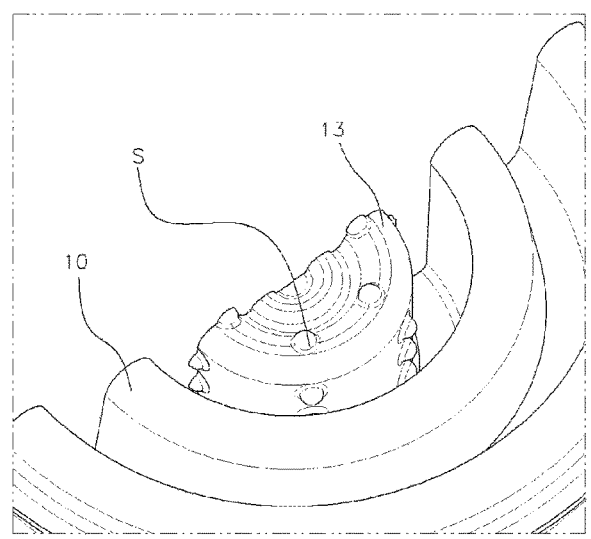
FIG. 4 is a view illustrating a bottom surface of the diaphragm according to the present invention.

As illustrated in FIG. 4, the scraps 14 are disposed to form multiple rows on the bottom surface and the outer circumferential surface of the part portion 13, and formed as small steel pieces that may be magnetized. Further, the part portion 13 is elastically deformed while increasing a diameter thereof when the scraps 14 come into close contact with the body portion 20*a*, and the protruding surface 15 is spread out to be flattened as illustrated in FIG. 6.

Figure 5:
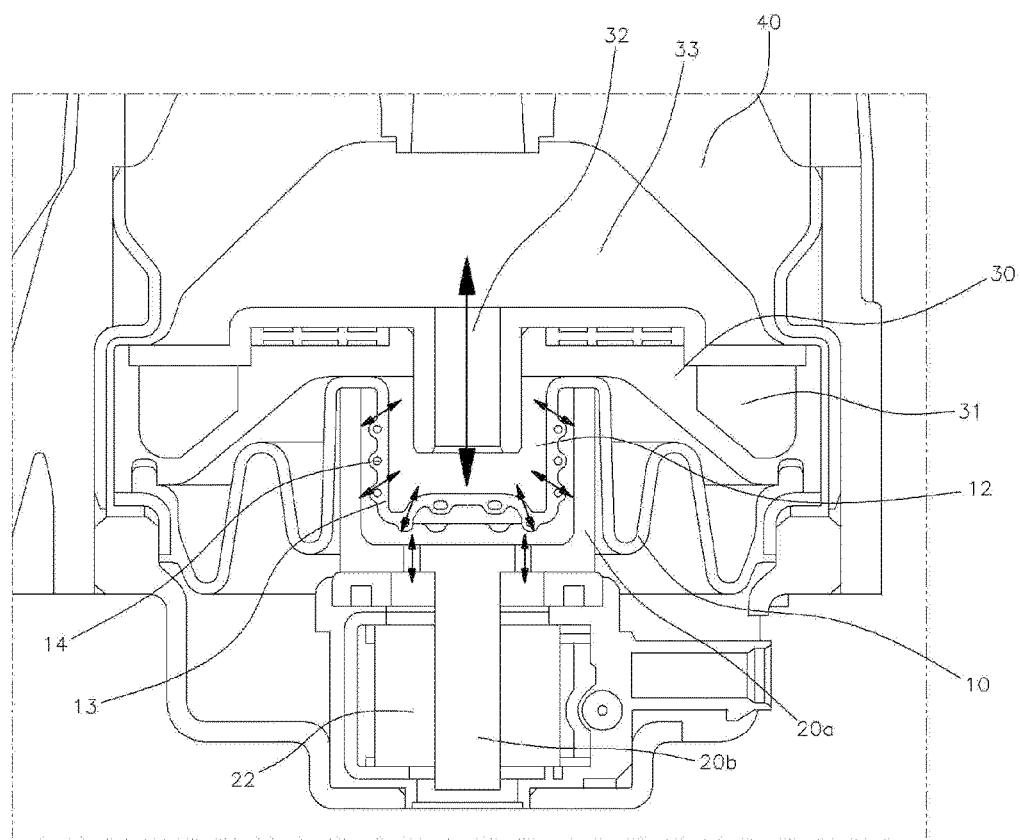
FIG. 5 is a view illustrating an internal state of the exemplary active mount according to the present invention when no electric power is applied to a coil (when a vehicle is idling).

Referring to FIG. 5, in order to lower dynamic characteristics when a vehicle is idling, electric power applied to the coil 22 is cut off so that the hydraulic liquid may flow even through the second flow path 32, and as a result, the body portion 20*a* is maintained to a non-magnetized state, such that the part portion 13 is elastically deformed so that a volume of the second lower liquid chamber 12 is changed (that is, the hydraulic liquid flows to the second lower liquid chamber and the upper liquid chamber through the second flow path).

Since the second flow path 32 has a structure that is rectilinearly opened in up and down directions, and has a shorter channel and a wider area than the flow path 31 formed along a circumference of the nozzle plate 30, the hydraulic liquid flows primarily through the second flow path 32. Therefore, the part portion 13 is freely and elastically deformed, and as a result, vibration at a bandwidth of 25 to 30 Hz, which occurs when the vehicle is idling, is more efficiently attenuated.

Figure 6:
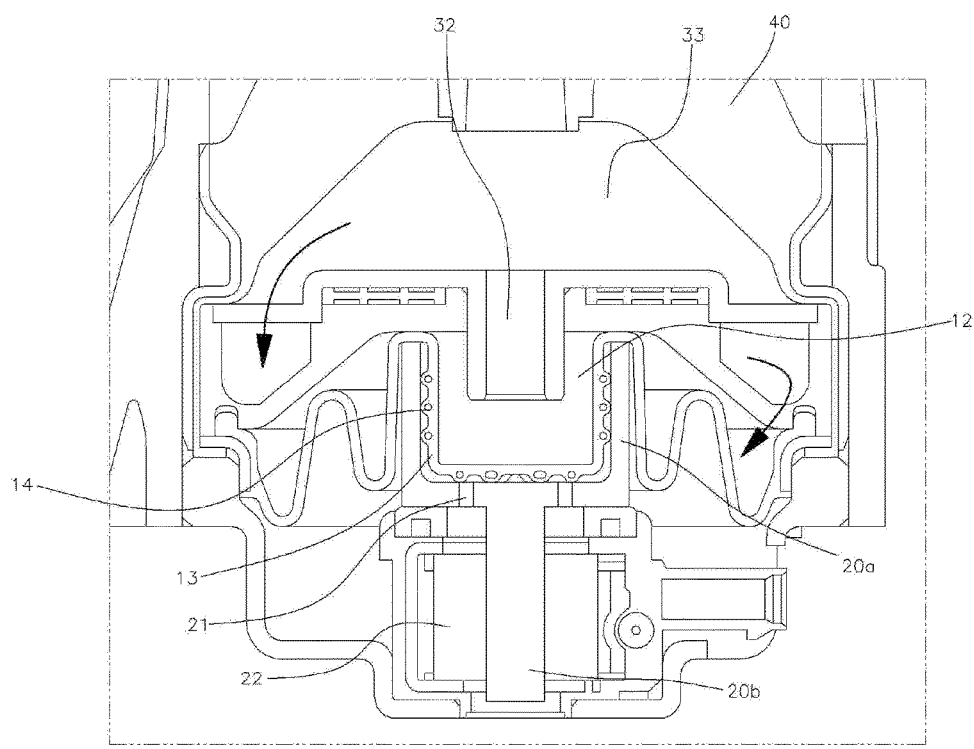
FIG. 6 is a view illustrating an internal state of the exemplary active mount according to the present invention when electric power is applied to the coil (when the vehicle travels).

Referring to FIG. 6, when the vehicle travels, electric power is applied to the coil 22 to block the hydraulic liquid from flowing through the second flow path 32, and the body portion 20*a* is magnetized. Therefore, the steel scraps 14 coupled to the part portion 13 come into close contact with the inner circumferential surface of the body portion 20*a*, and as a result, the motion of the part portion 13 is fixed in a state in which the part portion 13 is elastically deformed.

Therefore, the hydraulic liquid is inhibited from flowing through the second flow path 32, and only a flow through the flow path 31 is permitted. That is, the hydraulic liquid flows to the upper liquid chamber 33 and the first lower liquid chamber 11 only through the flow path 31 having a longer channel, and as a result, vibration at a bandwidth of 10 to 13 Hz, which occurs when the vehicle travels, is more efficiently attenuated.

The active mount according to the present invention more assuredly restricts the behavior of the part portion 13 (assuredly suppresses a flow through the second flow path), thereby maximizing a loss factor at a bandwidth of 13 Hz which is required to suppress vibration when the vehicle travels, and lowering dynamic characteristics.

In comparison with a direct opening and closing method, the present invention having the aforementioned configuration uses the miniaturized yoke and may change damping characteristics by remodeling only the yoke and the diaphragm in the structure in the related art, such that it is possible to reduce production costs and weights, the structure is comparatively simple and has better durability, and it is possible to obtain a higher rate of change in properties when electric power is turned on and off For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active mount in which a nozzle plate is mounted between an insulator and a diaphragm to divide an inner space into an upper liquid chamber and a lower liquid chamber, and an encapsulated hydraulic liquid flows from the nozzle plate through a first flow path depending on a change in fastened state of the liquid chambers, the active mount comprising:
    the nozzle plate having a second flow path that is spaced apart from the first flow path and allowing the upper liquid chamber and the lower liquid chamber to be in communication with each other;
    the diaphragm made of a material having elasticity and coupled to a lower portion of the nozzle plate to form the lower liquid chamber, the diaphragm having an inflection portion that is disposed to be in direct contact with a lower surface of the nozzle plate; and
    a yoke including a body portion that has a cup shape and has an upper end in close contact with a lower portion of the inflection portion, and a rod portion that is coupled to a lower portion of the body portion, the yoke configured to be magnetized when electric power is applied to a coil that is disposed adjacent to the yoke,
    wherein the lower liquid chamber is divided into a first lower liquid chamber which is disposed outside the inflection portion and in communication with the first flow path, and a second lower liquid chamber which is disposed inside the inflection portion and in communication with the second flow path, and metallic scraps are coupled to a part portion of the diaphragm which is defined as an inside portion of the inflection portion so as to form the second lower liquid chamber, such that when the yoke is magnetized, elastic behavior of the part portion is restricted.

2. The active mount of claim 1, wherein the scraps are mounted to and included in the part portion, and when the yoke is magnetized, the part portion is configured to elastically expand so as to come into close contact with an inner circumferential surface of the body portion, such that the elastic behavior is restricted.

3. The active mount of claim 2, wherein a protruding surface, which is convexly bent upward, is formed on a bottom surface of the part portion.

4. The active mount of claim 2, wherein a venting hole is formed in the body portion so that air between the part portion and the body portion is discharged when the part portion elastically expands.

5. The active mount of claim 4, wherein a protruding surface, which is convexly bent upward, is formed on a bottom surface of the part portion.

6. The active mount of claim 5, wherein the scraps are disposed to form multiple rows on the bottom surface and the outer circumferential surface of the part portion.

7. The active mount of claim 1, wherein a protruding surface, which is convexly bent upward, is formed on a bottom surface of the part portion.

* * * * *